Feb. 16, 1960 W. W. PHARIS 2,925,470

TRUNK HUNTING SELECTOR

Filed Oct. 27, 1953 3 Sheets-Sheet 1

INVENTOR.
WILLIAM W. PHARIS
BY J. Harrison Whitesel
ATTORNEY

Feb. 16, 1960 W. W. PHARIS 2,925,470

TRUNK HUNTING SELECTOR

Filed Oct. 27, 1953 3 Sheets-Sheet 2

TRUNK SELECTOR 104

Feb. 16, 1960 W. W. PHARIS 2,925,470

TRUNK HUNTING SELECTOR

Filed Oct. 27, 1953 3 Sheets-Sheet 3

2,925,470

TRUNK HUNTING SELECTOR

William W. Pharis, Rochester, N.Y., assignor, by mesne assignments, to General Dynamics Corporation, a corporation of Delaware Application October 27, 1953, Serial No. 388,526

24 Claims. (Cl. 179—18)

This invention relates to an electro-mechanical telephone switching system, and more particularly to a non-numerical trunk hunting selector switch.

A "bright-dim" monitor lamp is shown but not claimed since this feature is covered by my co-pending application Serial Number 313,667, filed October 8, 1952, now Patent 2,685,616.

Electro-mechanical telephone switching systems very often are adapted to give one exchange access to another exchange by way of various trunk circuits which may be seized by a trunk selector switch. The most efficient system of this type provides means whereby each outgoing call may select any one out of all of the available trunk circuits since this provides a maximum flexibility of trunk distribution. Usually the trunk distributor is a rotary switch of special design which is adapted to search over a large number of trunks. The cost of the telephone system could be materially reduced if these special switches could be replaced by the more conventional step-by-step switch, thus eliminating the need for a small quantity of relatively higher priced components. However, the usual step-by-step switch is limited in that only ten trunks are available on each level and therefore access to all available trunk circuits is not possible if more than ten are provided. Therefore, this invention is directed to means for increasing the flexibility of a step-by-step switch by giving trunk hunting access to any one of its bank contacts.

An object of this invention is to provide a new and improved selector switch.

A further object is to provide a flexible telephone system, using only conventional switches to select any one of a plurality of trunk circuits.

Another object of this invention is to provide a new trunk selector switch whose motion is controlled by an auxiliary brush in the first direction and by a supervisory brush in the secondary direction.

Still another object of this invention is to adapt a conventional step-by-step switch to provide level-hunting and trunk-hunting over a hundred points of access.

Also, an object of this invention is to provide a marking circuit which extends through all trunk circuits common to a given level of a two motion, step-by-step trunk selector for indicating when at least one of the trunk circuits associated with that level is idle.

Yet another object of this invention is to provide a trunk selector which automatically starts hunting responsive to seizure of a level with an idle trunk.

A further object of this invention is to provide a two motion, step-by-step switch which hunts in its first direction of motion for a level with an idle trunk and which cuts-in on the first level having an idle trunk to hunt in its second direction of motion for idle trunk.

A still further object of this invention is to provide a switch which drops-back to normal if it searches in its secondary direction and fails to find an idle trunk; thereafter, it searches again in its primary direction for another level with an idle trunk.

Another object of this invention is to provide a two motion trunk selector which hunts in its first direction for a level with an idle trunk, but if none is found, steps into overflow and returns a busy signal.

Briefly, this invention accomplishes the above cited objects by providing a non-numerical, two motion, step-by-step trunk selector which is arranged to step in its first direction of motion in search of a particular level containing at least one idle trunk. When such a level is found, the selector switch stops and searches in its secondary direction of motion to seize the idle trunk. If it should happen that the idle trunk or trunks become busy while the switch is hunting in its secondary direction, it returns to normal and proceeds to search again in its primary direction for another level containing an idle trunk. If it should happen that all ten levels are searched without finding one containing an idle trunk, the switch steps into overflow and returns a busy signal to the calling subscriber or operator, as the case may be.

Any suitable two directional or two motion switch may be used according to this invention if it is provided with an additional or auxiliary brush or wiper that is adapted to move over its associated bank of contacts in the first direction of motion. For convenience of description it is assumed hereinafter that a flat-type, two direction, step-by-step switch is used. A switch of this type is made and sold under the trademark "XY." This particular switch has a first set of brushes or wipers commonly called the T, R, S and HS wipers or brushes. The T and R brushes carry the talking circuit and the S and HS brushes usually carry supervisory circuits, for example busy tests are via the S brush. The HS brush is not material to this particular invention. The "XY" switch also has an auxiliary wiper or brush commonly called the "XX" brush which moves over an associated bank of contacts in the first or primary motion of the switch, while the T, R, S and HS brushes move over their associated terminals in the secondary motion. It should be understood, however, that other types of switches could be used.

The term "brush" is used hereinafter to designate an electrical contact which is moved into engagement with a bank of stationary contacts. It is thought that this term includes "brush," "wiper" and other commonly used expressions.

As in the case of most telephone systems, the positive terminal of the exchange battery is described as connected to ground and, therefore, the terms "(−) battery" and "grounded (+)" are used throughout the specification to designate this arrangement. It should be understood that this or any other similar power supply could be used without departing from the scope of this invention.

It is thought that a more complete understanding will be had from a description of the attached drawings.

Figures 1, 4:
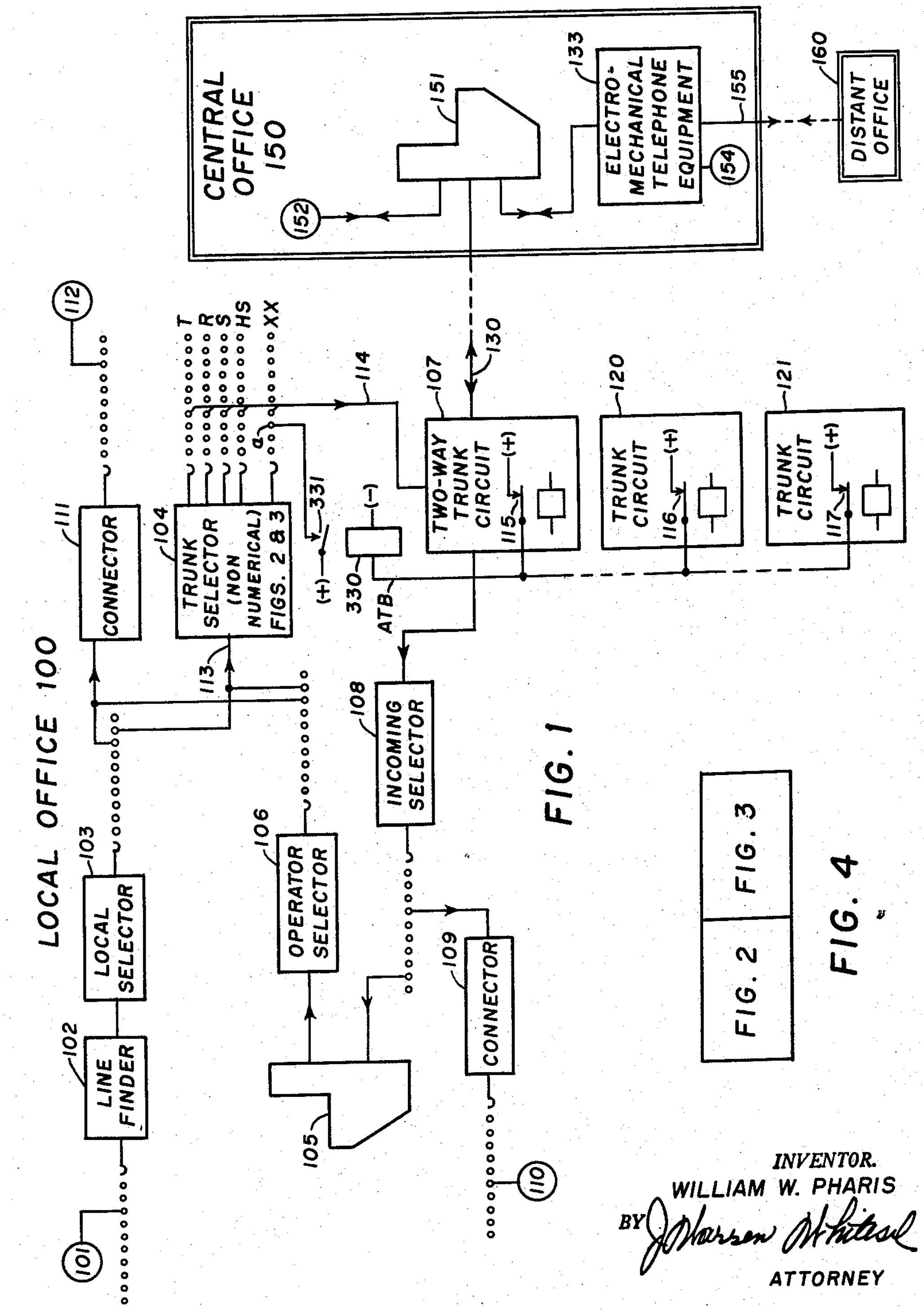
Fig. 1 shows the trunking diagram of a system involving this invention.
Fig. 4 shows how Figs. 2 and 3 should be joined to disclose a complete selector circuit.

Briefly, Fig. 1 shows a telephone system wherein a local subscriber line 101 may be seized by line finder 102 which is connected permanently with local selector 103. Subscriber 101 receives dial tone and then dials to set selector 103 which may be operated to seize local subscriber 112 by way of connector 111; or, local selector 103 may be operated to seize non-numerical, two-motion trunk selector 104 which operates immediately and without further subscriber dialing searches in its primary direction of motion for a level having access to idle trunk equipment. Assuming that two-way trunk circuit 107 is idle, selector 104 stops on the third level after which it searches in its secondary direction of motion, thereby completing a connection through two-way trunk circuit 107 and over trunk line 130 to operator position 151 at central office 150. The operator answers and converses with the calling subscriber to find the destination of the call. Then, a connection may be completed either on a direct manual basis to a subscriber such as 152, for example, or, by way of electro-mechanical telephone equipment 133 to either subscriber 154 or to a distant office 160 via trunk line 155.

A call similar to that outlined above may be completed from operator position 105 through operator selector 106, either to a local subscriber 112 via connector 111 or to subscriber 154 or distant office 160 via trunk selector 104, two-way trunk circuit 107, trunk line 130 and central office 150.

Means is provided in trunk selector 104 for indicating a level including bank terminals terminating an idle trunk circuit such as 107, for example. More specifically, ten trunk circuits such as 107, 120 and 121 may be seized from the third level of trunk selector 104 according to busy markings on auxiliary contact "*a*" and likewise each of the other nine levels would have access to similar circuits. Each of these trunk circuits includes a relay which operates in any conventional manner, not shown, as the circuit becomes busy to open a set of contacts such as 115, 116 or 117, respectively, for example. As each opens, a marking is removed from the common conductor ATB. When the last idle trunk circuit in a particular level becomes busy, the last marking is removed from conductor ATB corresponding to that level and common relay 330 releases to close contacts 331, thus applying a busy marking, such as grounded (+), for example, to the XX bank terminal corresponding to the busy level. The XX bank is searched by trunk selector 104 in its primary direction; therefore, since continued primary motion depends upon the presence of ground on the XX bank, selector 104 stops on the first level containing an idle trunk connection as indicated by an ATB conductor which is marked by an absence of ground. Trunk selector 104 is also provided with four brushes which pass over terminals T, R, S and HS during the switches' motion in its secondary direction. The conversation path is carried by the T and R terminals while two supervisory and testing circuits are completed over the S and HS terminals. For example, markings on an S terminal indicate whether a particular line is busy or idle.

If the trunk selector searches over the entire ten levels, to which it has access, without finding an idle marking, it steps into overflow at the end of its primary motion and returns a busy signal.

Incoming calls either from a distant office 160 or from central office 150 may be completed over trunk line 130 and two-way trunk circuit 107 to incoming selector 108 which then may be directed to seize either subscriber 110 over connector 109 or operator 105 as desired.

Figure 2:
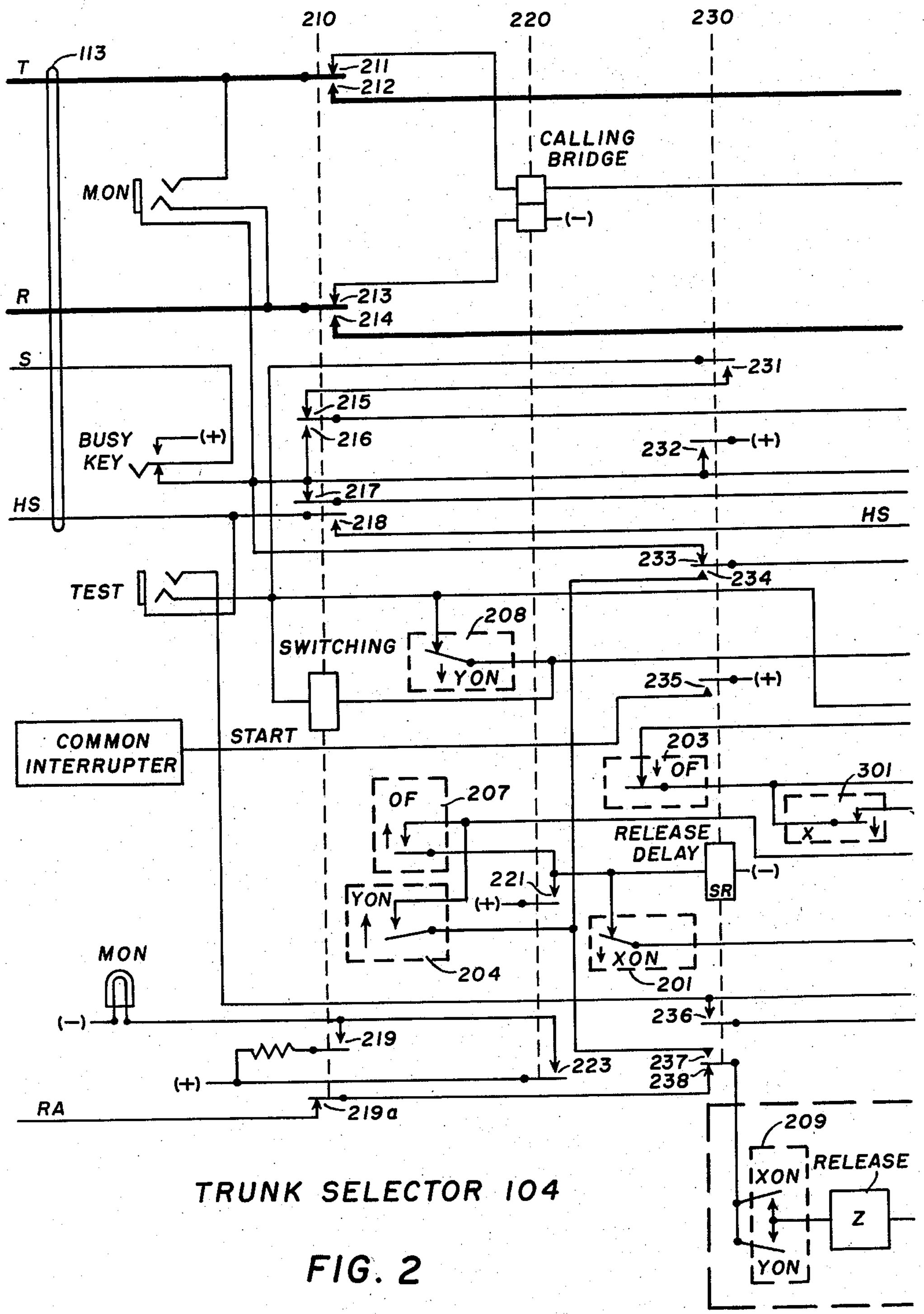
Figs. 2 and 3 show details of the trunk selector.
Figure 3:
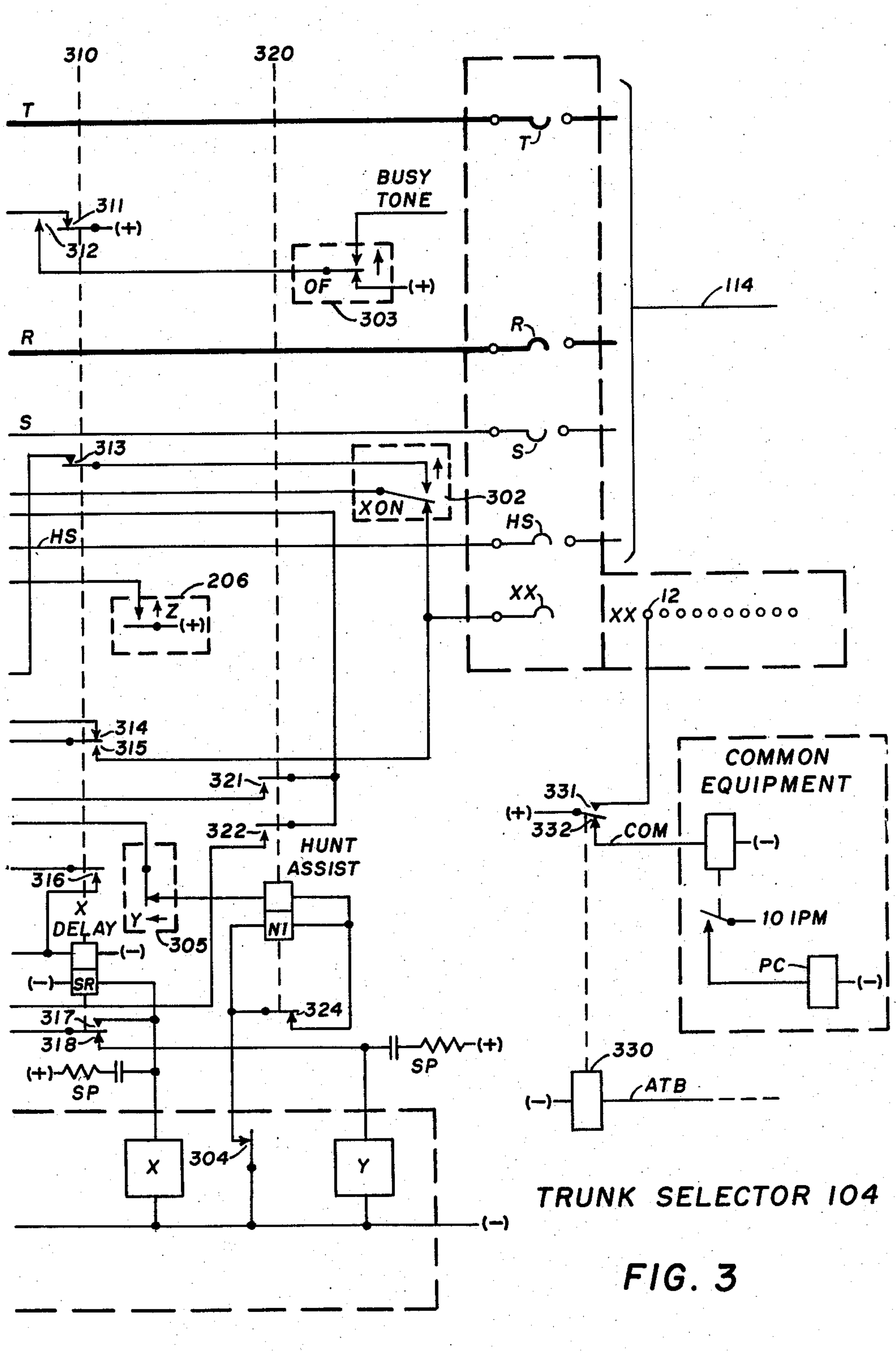

Trunk selector 104 is shown in detail in Figs. 2 and 3. Conductors T, R, S and HS, shown in the left of Fig. 2, correspond to conductor group 113 in Fig. 1, while the T, R, S and HS brushes, shown toward the right of Fig. 3, have access to terminals connecting with conductor group 114 in Fig. 1. The ATB lead and relay 330 are shown at the lower right of Fig. 3.

*Detailed description*

*Seizure.*—Trunk selector 104 is seized over conductors 113 which may extend from either local selector 103 or operator selector 106, as the case may be. Responsive thereto, a loop circuit is completed over conductors T and R for operating calling bridge relay 220. This circuit may be traced from grounded (+) on contacts 311 through the upper winding of calling bridge relay 220, contacts 211, over a talking loop from conductor T to conductor R and then through contacts 213 and the lower winding of relay 220 to (−) battery.

Calling bridge relay 220 operates and closes parallel circuits for energizing release delay relay 230 and X-delay relay 310. These relays are operated over an obvious path including contacts 221, and in the case of relay 310, X-off-normal contacts 201. Contacts 223 close to complete a circuit from (−) battery connected through the monitor lamp MON to grounded (+). The lamp glows brightly as an indication that selector 104 has been seized.

Release delay relay 230 is a slow release relay which is arranged to forward a holding ground after switch-through and to hold trunk selector 104 operated throughout any incidental interruptions in the telephone loop which might inadvertently occur during trunk hunting and thereby release switch 104. Contacts 235 close to start the common interrupter. Contacts 232 close to extend a grounded (+) marking for operating the stepping magnets, to hold preceding circuits operated and to make trunk selector 104 busy to other equipment by grounding conductor S.

*Primary motion.*—The first step is taken under the influence of release delay relay 230 and subsequent steps are taken under the joint action of hunt assist relay 320 and either the X or Y magnets as the case may be. In greater detail, the first step is taken when grounded (+) is extended from contacts 232 over a path which may be traced through X-off-normal contacts 302, operated contacts 315, overflow contacts 203, X-interrupter contacts 301, Y-interrupter contacts 305, the upper winding of hunt assist relay 320, contacts 324 and Z-interrupter contacts 304 to (−) battery. Hunt assist relay 320 is a fast operate relay due to the low resistance of its upper winding. Therefore, it is provided with a non-inductive lower winding which is a high resistance normally short-circuited to give a fast operate characteristic to relay 320. Upon operating, it opens contacts 324 to remove this short-circuit and thereby reduce current through the upper winding as a safety precaution. Contacts 322 close to complete a circuit for energizing magnet X to cause trunk selector 104 to step-off in its primary direction. This circuit may be traced from grounded (+) applied through contacts 232, 217, 322, 236, 317, and the winding of magnet X to (−) battery. When magnet X operates, it opens its interrupter contacts 301 thereby releasing hunt assist relay 320. This in turn opens contacts 322 which releases magnet X to close contacts 301. Responsive to this operation, the XX brush is left standing on its first terminal.

Assuming that all trunks in the first level are busy, a ground marking is encountered on the first terminal in the XX bank representing the first level which is returned to operate hunt assist relay 320. It should be noted that the original path for causing the first step was traced from contacts 232 to relay 320 through X-off-normal contacts 302 which open responsive to switch motion in the primary direction; therefore, hunt assist relay 320 is now dependent upon the circuit which may be traced from grounded (+) applied over contacts 331, terminal 1 of the XX bank, the XX brush, contacts 315, 203, 301 and 305, and the upper winding of hunt assist relay 320, to (−) battery by way of contacts 324 and 304. Relay 320 operates to close contacts 322 which completes a circuit from grounded (+) through contacts 232, 217, 322, 236, 317, and the winding of magnet X to (−) battery. It operates and steps the switch a second time in its primary direction.

When the switch steps far enough for the XX brush to clear its first terminal but not far enough to touch its second terminal there is an instant when the circuit to relay 320 is broken and there might be a false operation if some safety feature were not provided. This feature comprises contacts 321 which complete an alternate holding path from contacts 232 to relay 320.

The switch steps and after the XX brush has moved far enough to touch its second terminal, interrupter contacts 301, again open to release relay 320 which opens contacts 321 and 322, thereby releasing magnet X which in turn again closes contacts 301 to complete another test circuit for determining whether the second level is idle or busy. Assuming that the second level does not contain an idle trunk, a grounded (+) marking is encountered on terminal 2 which is extended over the XX brush to cause trunk selector 104 to take a third step in exactly the same manner as was described above in connection with step 2. This process continues until an absence of ground is encountered by the XX brush thereby indicating that the switch has reached a level containing an idle trunk at which time primary motion ends.

*Stepping circuit is switched.*—Slow release X-delay relay 310 releases at the end of the primary motion. It might be noted that when the switch took its first step, X-off-normal contacts 201 opened to break the original operating path for X-delay relay 310. However, a circuit is completed for re-energizing this relay each time that grounded (+) is extended to pulse the X magnet during stepping, the circuit being from (−) battery, through the lower winding of relay 310, contacts 317, 236, 322, 217 and 232 to grounded (+). The slow release characteristics of relay 310 are such that it does not release during stepping. Once an idle level is encountered, contacts for that level, such as 331, are open; hence, no stepping circuit is completed either for operating hunt assist relay 320 or for re-energizing X-delay relay 310. Therefore, after a brief interval determined by its slow release characteristics, X-delay relay 310 releases to open contacts 317 and to close contacts 318. This changes the stepping path from its connection with magnet X to a connection with magnet Y.

The circuit for controlling the hunt assist relay and hence selector motion is switched from the XX brush to the S brush at contacts 314 and 315. That is, the selector motion was controlled by hunt assist relay 320 responsive to the circuit from busy ground applied to the XX brush and extended over contacts 315, 203, 301, 305, the upper winding of relay 320, contacts 324 and 304 to (−) battery. Now the circuit for hunt assist relay 320 is extended from brush S over contacts 215, 231, 314, 203, 301, 305, the upper winding of hunt assist relay 320, contacts 324 and 304 to (−) battery.

*Secondary motion.*—The switch is now ready to search in its secondary direction for an idle trunk circuit. The operating circuit for hunt assist relay 320 is connected from (−) battery applied through contacts 304 and 324 to the upper winding of relay 320 and contacts 305, 301, 203, 314, Y-off-normal contacts 208, contacts 313 and operated X-off-normal contacts 302 to grounded (+) supplied through contacts 232. Relay 320 operates and closes a circuit to the secondary magnet Y causing the switch to take its first step in the secondary direction. This circuit extends from (−) battery, through the winding of magnet Y, contacts 318, 236, 322 and 217 to grounded (+) applied through contacts 232. Magnet Y operates, the switch steps and interrupter contacts 305 open, thereby releasing hunt assist relay 320 which in turn opens contacts 322 to release magnet Y. Upon completion of this operation, brushes T, R, S and HS are resting on the first set of contacts in the level. If the associated trunk is busy, a ground marking is encountered by brush S which is effective to cause the switch to take another step in its secondary direction. The circuit for this operation may be traced from the busy ground marking through brush S, contacts 215, 231, 314, 203, 301 and 305, through the upper winding of hunt assist relay 320, contacts 324 and 304 to (−) battery. Hunt assist relay 320 operates and closes contacts 322 for operating the Y magnet over the circuit from grounded (+) extended through contacts 232, 217, 322, 236, 318, and the winding of magnet Y to (−) battery. The switch takes another step and if ground is encountered by brush S the process is repeated until an absence of ground is found. At this time hunt assist relay 320 is not reoperated and the switch motion halts.

*Switch-through.*—Upon finding an idle line, switching relay 210 operates to switch-through the talking conductors T and R at contacts 212 and 214, respectively, from the preceding circuit to conductor group 114 leading to two-way trunk circuit 107. It should be noted that relay 210 is prevented from operating when brush S contacts busy terminals by shunting out the winding of relay 210. One path to ground may be traced from grounded brush S, over contacts 215 and 231, through the winding of relay 210 and contacts 313 and operated X-off-normal contacts 302 to grounded (+) applied through contacts 232. A circuit may also be traced from the left side of switching relay 210, through contacts 314, 203, 301 and 305, the upper winding of hunt assist relay 320 and contacts 324 and 304 to (−) battery. Thus, the circuit arrangements are such that as long as brush S encounters a grounded (+) marking, switching relay 210 is shunted and does not operate. However, when this brush finds an absence of ground, switching relay 210 is no longer shunted to ground through brush S but is connected to (−) battery.

The circuit arrangements are also such that hunt assist relay 320 does not operate in series with switching relay 210, although relay 210 operates in series with relay 320. Contacts 216 close to extend sleeve conductor S back through contacts of the busy key and conductor S to the sleeve of the preceding circuit, such as local selector 103. Contacts 216 also forward grounded (+) from contacts 232 to trunk circuit 107 to hold it busy until it has time to apply a busy and holding ground to maintain switching relay 210 operated. Also, this is a busy marking to brush S for preventing seizure of these terminals by another trunk selector. The holding circuit from trunk circuit 107 for switching relay 210 may be traced from the S brush at the right side of Fig. 3, through contacts 216, operated X-off-normal contact 302, contacts 313, the winding of switching relay 210 and contacts 314, 203, 301, 305, the upper winding of hunt assist relay 320, contacts 324 and 304 to (−) battery.

Means is provided for reducing the possibility of false seizure by two switches searching simultaneously as well as premature operation of switching relay 210. For example, if two switches land on an idle terminal at once, each may switch-through before a guarding ground is applied to terminal S if some safety feature is not provided. Also, there is an instant after stepping from a terminal and before the S brush reaches the next terminal when hunt assist relay 320 might release to cause false operation; or, switch-through relay 210 may become unshunted and operate. To forestall any possible release of hunt assist relay 320, a locking ground is applied over the circuit through contacts 232, 217, 321, 301 and 305, the upper and lower windings of relay 320 in series, and contacts 304 to (−) battery. A guarding ground is applied to brush S under the control of relay 320 to guard against operation of switching relay 210 and to reduce simultaneous seizures by two switches to a minimum. This function results from completion of the path over contacts 232, 217, 321, 203, 314, 231, 215 and brush S.

Referring back to the operation of switch-through relay 210, in response to the opening of contacts 211 and 213, calling bridge relay 220 releases and opens contacts 221, thereby restoring release delay relay 230 which in turn opens contacts 231 and 232 since they are no longer required, and closes contacts 233 to prepare a path for guarding trunk selector 104 on release. Contacts 235 are opened since it is no longer necessary to maintain operation of an interrupter. Contacts 236 open to break the stepping path to magnet Y. Contacts 237 open one path in the operating circuit of release magnet Z and contacts 238 close to prepare a path over which the switch is to be released.

*Release.*—After the conversation is completed, the grounded (+) marking formerly extended over brush S from the right side of Fig. 3 is removed—as is conventional—and switching relay 210 releases to return calling bridge relay 220 to its normal connection with the talking conductors T and R and to break the continuity of the S conductor at contacts 216. Contacts 219(*a*) close to extend a ground marking (not shown) which is applied to release alarm conductor RA, over contacts 219(*a*), 238, and X and Y off-normal contacts 209, to the winding of the release magnet Z and (—) battery. Magnet Z releases to cause the switch to return to normal. Release magnet Z closes its interrupter contacts 206 (Fig. 3) for applying a grounded (+) marking to the S conductors to hold trunk selector 104 busy during release. Z interrupter contacts 304 are opened to prevent an inadvertent operation of the hunt assist relay and to insure the release of switching relay 210.

*All trunks become busy during secondary switch motion*

It sometimes happens that two switches are searching simultaneously and each cuts into a level containing only one idle trunk since each finds absence of ground on the XX level. One of these switches reaches the trunk first. Therefore, it is necessary to prevent the second switch from seizing this trunk and to direct the switch to a different level in which there may be an idle trunk. The first switch to seize the trunk forwards a ground marking over the S brush. This marking is encountered by the second switch and it steps to test the next trunk in the manner explained previously.

Assuming that all of the remaining trunks are busy, the switch steps into an overflow position responsive to which overflow contacts 203, 207 and 303 are operated. Contacts 203 break the path to hunt assist relay 320 so that switch motion stops. Contacts 207 close to complete a circuit for operating release magnet Z. This circuit may be traced from (—) battery through the winding of magnet Z, both the X and Y off-normal contacts 209, operated contacts 237, Y-off-normal contacts 204, oxerflow contacts 207 and contacts 221 to grounded (+). The switch returns to normal as described above. Following this, X-delay relay 310 reoperates via contacts 221 and 201 and trunk selector 104 is operated again as when it was first seized. The control path to control switch motion is reswitched at contacts 315 and 314 from connection with the S brush to connection with the XX brushes and once again it searches in its primary direction for a level containing an idle trunk.

Since there may be idle trunks in other levels, the calling subscriber should not receive busy tone at this time; therefore, contacts on X-delay relay 310 are used to distinguish between this condition and an all trunks busy condition and to prevent the return of busy tone at this time. To review briefly, the X-delay relay released at the end of the first digit. When the switch steps into overflow, contacts 207 close; however, contacts 316 are now open so the X-delay relay is not affected at this time. Therefore, contacts 311 and 312 are normal and no busy tone is transmitted.

*All trunks busy*

When all trunks are busy, each of the trunk circuits removes a grounded (+) marking from an all trunks busy conductor ATB, thereby releasing relay 330 and similar relays for all ten levels. The switch hunts out in the primary direction as explained under the subheading "Primary Motion" and on each step the XX brush encounters a busy ground marking causing the switch to step-on to test the next level. After reaching the last level, the switch steps into overflow whereupon overflow contacts 203, 207 and 303 are operated and a busy signal is returned to the calling subscriber.

As in the case of a busy level, overflow contacts 207 operate; however, this time a busy signal is sent. To review briefly, X-delay relay 310 originally operated over a path including contacts 221 and 201. Contacts 201 open when the switch steps off-normal in its primary direction. Following this and on each step, relay 310 receives a pulse of energizing current over contacts 317, 236, 322, 217 and 232. The slow release characteristics of this relay are such that it does not release between pulses; therefore, it remains operated as long as the switch is stepped in its primary direction. When the overflow position is reached, relay 310 locks operated over its own contacts 316 and operated contacts 207 and 221 to grounded (+). Therefore, in this case, a busy tone is transmitted through overflow contacts 303 and X-delay contacts 312, the upper winding of relay 220 and contacts 211 to the calling subscriber.

Overflow contacts 203 open the path to hunt assist relay 320 thereby preventing any further operation of stepping magnets X and Y.

The calling subscriber hears the busy tone and replaces his receiver, thereby releasing calling bridge relay 220 which in turn opens contacts 221 for restoring release delay relay 230 and X-delay relay 310. Relay 230 closes contacts 238 for completing a path from release alarm conductor RA through contacts 219(*a*), 238 and X-off-normal contacts 209 to release magnet Z and (—) battery thereby restoring the switch as explained under the subheading "Release." The circuit is now restored to normal.

*Miscellaneous*

Various resistor-capacitor networks are shown and labeled "SP." These are more or less conventional circuits for spark protection in the stepping circuit. Jack MON permits a maintenance man to monitor both the switch operation and calls, as required. The busy key is arranged to busy trunk selector 104 to other selectors, such as 103 or 106, for example. The TEST jack permits conventional testing. Contacts 219 provide a bright-dim feature for monitor lamp MON so that maintenance personnel may determine whether or not the cell has been switched-through; that is, when the switch is seized, a circuit is completed through contacts 223 for causing lamp MON to glow brightly; whereas, after switch-through, calling bridge relay 220 releases and contacts 223 open while contacts 219 close to extend grounded (+) through a resistance to monitor lamp MON causing it to glow dimly. This feature is claimed in my co-pending application Serial Number 313,667, filed October 8, 1952, now Patent 2,685,616.

Means is provided for recording the total time during which all trunks are busy. When relay 330 releases, it is an indication that all equipment in a particular level is busy. Therefore, a grounded (+) marking is removed from conductor COM leading to common equipment. As each level becomes busy, it removes still another marking from this conductor so that when all levels are busy a relay in the common equipment is released to connect a 10 i.p.m. conductor to peg count meter PC. Thus, the meter is operated ten times per minute to give an indication of how long the trunks are busy. Contacts 218 open and close the HS conductor on switch-through so that certain supervisory functions may be provided, such as conversation timing, toll marking, and the like.

While I have shown only one embodiment of my invention, it is my intention to claim not only this particular circuit but also to claim all equivalent circuits.

What is claimed is:

1. In a telephone system, a non-numerical, two-direction, step-by-step trunk selector having a bank of terminals divided into a plurality of levels, means for extending calls to said selector, means for completing said calls from said selector, a plurality of trunks connected between said bank of terminals and said means for completing calls, means in said selector responsive to seizure for automatically searching in a first of said two directions for a level having access to idle trunks, and means for searching in the second of said two directions for said idle trunks.

2. The combination as set forth in claim 1 wherein means are provided for returning a busy signal if said means for automatically searching in a first of said two directions is unsuccessful in finding a level having access to idle trunks.

3. The combination as set forth in claim 2 wherein means are provided for causing said means for automatically searching in a first of said two directions to drop back and re-search when said means for searching in a second of said two directions fails to find an idle trunk in the level searched.

4. The combination as set forth in claim 1 wherein means are provided for causing said means for automatically searching in a first of said two directions to drop back and re-search when said means for searching in a second of said two directions fails to find an idle trunk in the level searched.

5. The telephone system of claim 1 wherein said trunk selector further comprises a first set of brushes for engaging said bank terminals including a talking circuit and at least one supervisory circuit, said selector also comprising an additional brush and an associated set of bank contacts, means for causing said additional brush to search non-numerically over said bank contacts responsive to the first of said two directions of said selector, each of said contacts representing a different one of said levels, and means for marking each of said contacts when all trunks in the corresponding level are busy.

6. The combination as set forth in claim 5 and a busy signal source and means for coupling said source to said call initiating means when said means for automatically searching in a first of said two directions fails to find a level having access to idle trunks.

7. The telephone system of claim 5 wherein said means for causing searching in said first direction is a first stepping magnet, means comprising said additional brush for controlling said first magnet, and a second stepping magnet for causing said selector to operate in the second of said two directions under the influence of said supervisory circuit.

8. The telephone system of claim 7 and a common means including a hunt assist relay for controlling the operation of said first and second magnets, and means for switching said common hunt assist relay between said additional brush and said supervisory circuit.

9. The telephone system of claim 5 wherein said bank terminals are arranged in M levels with N terminals in each level, a plurality of trunk circuits and control means in each of said trunk circuits for controlling said marking on said contacts according to the idle or busy state of that trunk circuit.

10. The telephone system of claim 9 wherein said control means in each trunk circuit comprises a set of marked contacts, means for actuating one of each of said sets of contacts as its associated trunk circuit becomes busy, a conductor common to a plurality of said marked contacts, a common relay connected to said common conductor to be normally operated by the marking connected through any one of said marked contacts whereby said common relay releases when all of said marked contacts connected to said common conductor are open responsive to busy trunk circuits, other contacts on said common relay, and means for connecting a marking through said other contact to one of said bank contacts.

11. The telephone system of claim 5 wherein said bank terminals are arranged in M levels with N terminals in each level, and means for terminating said searching and starting searching in the second of said directions of said selector responsive to said additional brush finding a contact indicating a particular one of said levels which terminates a level of trunks including at least one idle trunk.

12. The telephone system of claim 11 and means comprising said supervisory circuit for causing said selector to search for said idle trunk among the trunks terminated in said particular level, means responsive to all trunks of said level being busy when searched for causing said selector to drop-back to normal in both said first and second directions and means responsive to said drop-back for causing said selector to move again in said first direction until said additional brush finds a contact indicating a level of trunks which includes at least one idle trunk.

13. The selector of claim 1 and means for halting movement in said first direction responsive to the selection of the first of said levels having access to idle trunk and means for initiating movement in said second direction responsive to said last named means.

14. In a telephone system, a two-directional, non-numerical, step-by-step selector switch comprising a set of brushes and an associated bank of terminals, means for extending calls to said selector, means for completing calls from said selector, a plurality of trunks extending from said selector bank of terminals to said means for completing calls, at least one of said brushes carrying a supervisory circuit, an auxiliary brush and an associated bank of contacts, means responsive to seizure of said selector for moving said auxiliary brush over said bank of contacts simultaneously with motion of said set of brushes in a first of said two directions, means comprising said auxiliary brush for directing said set of brushes to a group of said terminals including at least one idle terminal, and means comprising said one brush and said supervisory circuit for directing said set of brushes in said second direction in search of said idle terminal.

15. The selector of claim 14 wherein said means for moving said auxiliary brush and said set of brushes in said first direction comprises a first stepping magnet and means including a second stepping magnet for moving said set of brushes in said second direction, circuit means whereby said auxiliary brush controls said first magnet and said one brush controls said second magnet.

16. The selector of claim 14 wherein said means for moving said auxiliary brush and said set of brushes in said first direction comprises a first magnet and means including a second stepping magnet for moving said set of brushes in said second direction, means common to said two magnets for controlling their operation, circuit means for connecting said auxiliary brush to control said common means during movement in said first direction, second circuit means for connecting said one brush to control said common means during movement in said second direction, and means responsive to finding said groups of terminals for switching said common means from connection with said auxiliary brush to connection with said third brush.

17. The selector of claim 16 and means operated at the extremity of said second direction for causing said selector to drop-back to normal if all of said group of terminals becomes busy before found by said one brush, and means responsive to said drop-back for reswitching said common means back to said connection with said auxiliary brush from said connection with said one brush.

18. The selector of claim 17 wherein said common means comprises a hunt assist relay, a slow release relay controlled by said hunt assist relay, and said means for switching and reswitching comprises contacts on said slow release relay.

19. A telephone system comprising subscriber lines, a two-motion trunk selector having a bank of terminals divided into levels, said selector having at least two brushes and two stepping magnets, one of said brushes arranged to move with one of said motions under the influence of a first of said magnets and the other of said brushes arranged to move with both of said motions under the influence of both of said magnets, automatic switching means for seizing said selector from said subscriber lines, means comprising said stepping magnets for automatically operating said selector in a first of its two motions responsive to said seizure, a plurality of trunks divided into subgroups, each subgroup connected to one of said levels, relay means for controlling said magnets, means for connecting said one brush to said relay means for controlling said first magnet to test various levels during a first of said two motions to determine whether any level includes an idle trunk, means for disconnecting said one brush from said relay means and for connecting said other brush to said relay means for controlling said second magnet to find said idle trunk in said level, and means responsive to all trunks busy for causing said trunk selector to transmit a busy signal to said subscriber line.

20. A trunk selector comprising a non-numerical, two-directional switch having access to banks of MN terminals, said bank terminals being divided into M levels of N terminals each, means for extending calls, a group of trunks connected between said bank terminals and said means for extending calls, a set of bank contacts each of which is individual to a different one of said levels, means for marking each of said bank contacts to indicate whether its level contains at least one idle trunk, and means for moving said switch responsive to seizure in its primary direction for testing each of said bank contacts to determine which is the first level including an idle trunk.

21. The selector switch of claim 20 and means for halting motion in said primary direction responsive to said switch finding a bank contact having an idle trunk marking, and means for causing said switch to search in its secondary direction over said level for the idle trunk.

22. The selector switch of claim 21 and means for returning said switch to its normal position if all trunks of said level become busy during motion in said secondary direction.

23. The selector switch of claim 22 and means for causing said switch to re-hunt over said bank contacts following each time that said switch is returned to normal from its movement in said secondary direction.

24. The selector switch of claim 23 wherein said means for moving said switch in said primary direction comprises a first stepping means and said means for moving said switch in said secondary direction comprises a second stepping means, a common control relay for operating said first and second stepping means, first circuit means for controlling said relay means from said bank contacts during said primary motion, other circuit means for controlling said relay means from said terminals and switching means for alternately connecting said relay means to either said first or said other circuit means.

References Cited in the file of this patent

UNITED STATES PATENTS

| | | |
|---|---|---|
| 2,210,068 | Dimond | Aug. 6, 1940 |
| 2,295,200 | Cesareo | Sept. 8, 1942 |
| 2,424,585 | Simon et al. | July 24, 1947 |
| 2,431,313 | Den Hertog | Nov. 25, 1947 |
| 2,660,619 | Kessler | Nov. 24, 1953 |
| 2,731,515 | Wicks | Jan. 17, 1956 |